Oct. 8, 1963 R. L. PHELAN 3,106,697

PULSE DISCRIMINATOR AND GATE SYSTEM

Filed Sept. 15, 1958 2 Sheets-Sheet 1

INVENTOR.
ROY L. PHELAN

BY John R. Manning

AGENT

Oct. 8, 1963 R. L. PHELAN 3,106,697

PULSE DISCRIMINATOR AND GATE SYSTEM

Filed Sept. 15, 1958

2 Sheets-Sheet 2

INVENTOR.
ROY L. PHELAN

BY John R. Manning

AGENT

United States Patent Office 3,106,697
Patented Oct. 8, 1963

3,106,697
PULSE DISCRIMINATOR AND GATE SYSTEM

Roy L. Phelan, Plymouth, Mich., assignor to Burroughs Corporation, Detroit, Mich., a corporation of Michigan Filed Sept. 15, 1958, Ser. No. 761,171
2 Claims. (Cl. 340—168)

This invention pertains to means for improving the transformation of digits in decimal code to digits in a modified binary code.

More particularly, the invention relates to the magnetic writing circuit of an automatic accounting machine wherein information such as amounts, may be codally represented on a record medium which is inserted into the accounting machine. One of the purposes of the invention is to accurately translate decimal data contained in decimal switches into a modified binary code and place the information upon a magnetic track attached to a record medium. The invention contemplates the use of a circuit, in conjunction with the translating circuits, to accurately translate the data onto the magnetic strips or tracks of the record medium and make provision for the rejection of initial writing pulses which are not of the desired duration.

Certain portions of the invention are described but not claimed in a co-pending joint application of Deighton et al. Serial No. 598,454, filed July 17, 1956, for "Automatic Accounting Machine" and assigned to the same assignee as the present invention. The present invention also contemplates the incorporation of a stepping switch into the circuit. Construction of the stepping switch is described and claimed in detail in a co-pending application of Deighton, filed March 4, 1955, Serial No. 492,247, now Patent Number 2,906,838, entitled "Program Scanning Apparatus" and also assigned to the same assignee as the present invention. The switch is designated SS3 in the present application.

Therefore, it is an object of the invention to improve the transformation of data encoded in decimal form into data encoded in a modified binary code in an electronic computer.

It is another object of the invention to improve the accuracy of a circuit for encoding binary information and its complement upon a record medium.

It is a further object of the invention to provide a circuit having novel means for discriminating between a first full pulse and a first partial pulse.

It is a still further object of the invention to provide a novel means incorporating the discriminating device of the invention which can also be used as a gate to inhibit the output of the discriminating device at a desired time.

In writing information magnetically on a document, two systems may be used, i.e, a synchronous system and an asynchronous system. In the synchronous system, the information is encoded upon the document when there is a coincidence of pulses between a timing generator and the information write circuit. In an asynchronous system, no timing generator is employed and there arises the problem of discrimination between a complete pulse and a partial pulse which may result due to the switching of the information pulse into the writing circuits after commencement of the pulse. This invention is capable of rejecting any initial partial pulses and encoding only the complete pulses on the magnetic record medium.

The magnetic record medium comprises a record having a plurality of different magnetizable areas thereon. For the purposes of this invention, there are at least two magnetizable areas or tracks upon which record data is or may be recorded. A first magnetic track will be used to record the information data and a second magnetic area or track will be used to record the complement of the information data. The first area or track will be known as the information or data track and the second as the complement track.

In the present modified binary coding system, only two conditions of magnetization are utilized: Magnetization of a discrete magnetic area in one polar direction is termed a "one" and magnetization in the opposite polar direction to the "one" is a "zero," but since the code as an entirety is coded on two tracks rather than a single track, the "zero" direction of magnetization may also be considered an erase. In other words the erase or "zero" is opposite of a "one."

If a "one" is to be written on the information or data track, it will be written on said track and a "zero" or erase will be continued on the complement track. Similarly, if there is no information to be written on the information track, that track will continue to be erased and a "one" will be written on the complement track.

The aforementioned objects and other objects of the invention will become more apparent by reference to the ensuing description and the accompanying drawings in which.

*Description of Invention*

Figure 1:
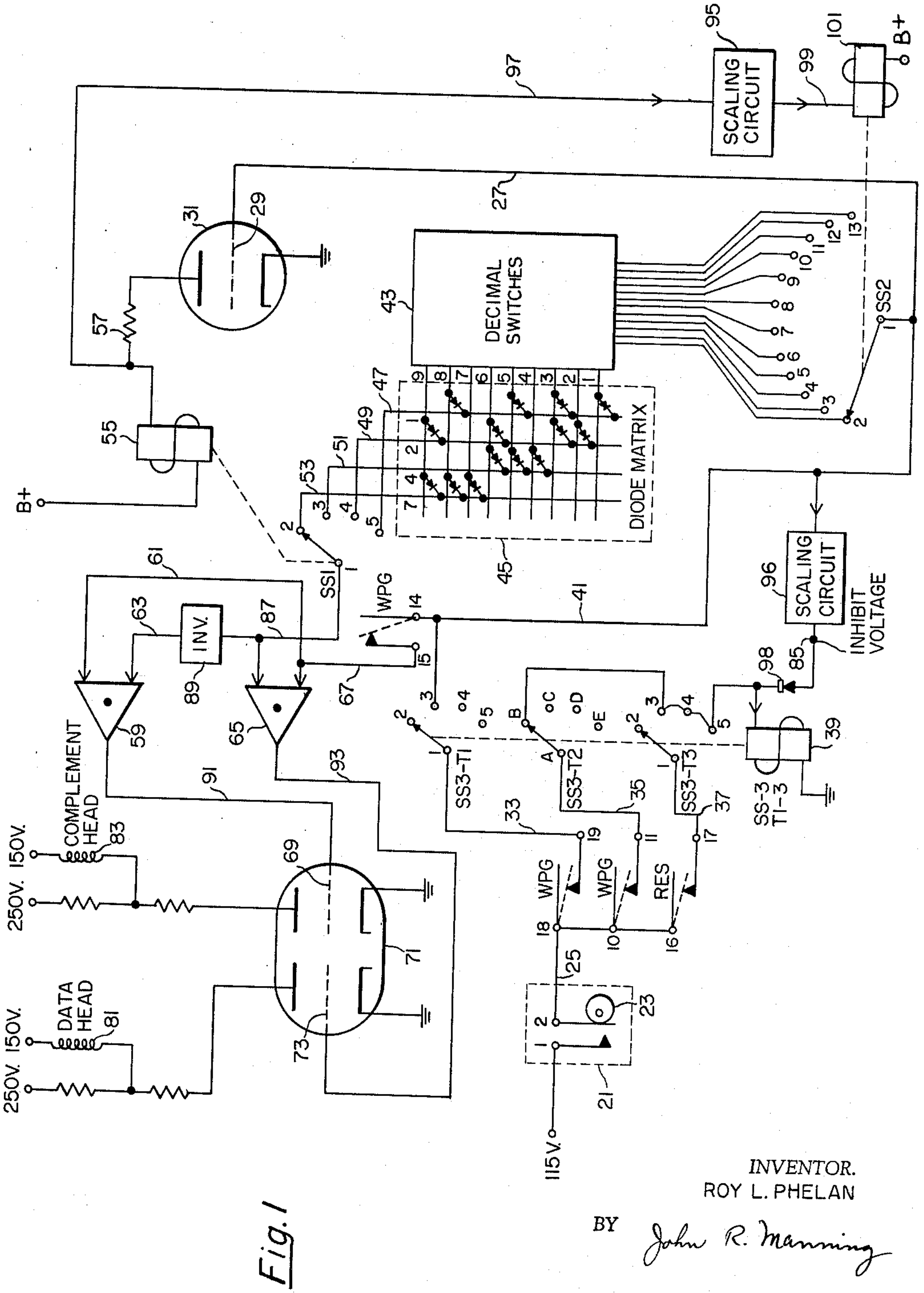
FIG. 1 is a circuit diagram showing the incorporation of the invention into a magnetic writing circuit.

Referring to FIG. 1 there is shown a pulse generator 21 having the contacts 1 and 2 and the cam 23. A constant voltage is applied to the contact 1. The output of the pulse generator is coupled through the conductor 25 to the contacts 18 and 10 of the WPG (write pulse gate) and the contact 16 of the RES (reset) contact. The WPG has the contacts 18 and 19 and also the contacts 10 and 11. As will be described later on, it is seen that the WPG also has the contacts 14 and 15. The RES has the contacts 16 and 17. The contact 19 of the WPG connects to the contact 1 of SS3–T1 (stepper switch 3-tier 1) through the conductor 33. Contact 11 of the WPG connects to the "A" contact of SS3–T2 through the conductor 35. The contact 17 of RES connects with the contact 1 of SS3–T3 through the conductor 37. SS3 is shown having three banks or tiers, each tier having an arm adapted to rotate and engage one of the four contacts of each tier. SS3 is operated through the actuation of the magnet coil 39.

The number three contact of SS3–T1 is connected to the contact 14 of the WPG, to the wiper arm of SS2 through the conductor 41, and to the grid 29 of the tube 31 by the conductor 27. The "B" contact of SS3–T2 is connected to contacts 3, 4, and 5 of SS3–T3. The conductor continues from contact 5 of SS3–T3 through the winding of the magnet coil 39. Also connected to the 5 contact of SS3–T3 is a conductor to the terminal 85. At terminal 85, an inhibit voltage may be applied to inhibit the entry of pulses into the system which inhibition results in a gating action. A diode 98 is inserted before the terminal 85 to prevent the pulses to the magnet coil 39 from entering the scaling circuit 96. SS2 is actuated by the magnet coil 101 and its wiper arm is used to energize the contacts of the decimal switches 43 which have been set by some previous operation as described, for example, in the earlier mentioned Deighton et al. application S.N. 598,454. SS2 has 12 contacts (2–13) which communicate with 12 decimal switches in the box 43. With 12 switches, it is intuitively clear that a number of 12 orders may be stored in these switches. The decimal switches in the box 43 may have been set by the add racks or actuators of an accounting machine. Leading from the decimal switches box 43 are nine lines representing the decimal numbers 1–9. These nine lines lead to the diode matrix 45 and are coupled to SS1 through the conductors 47, 49, 51 and 53. SS1 has a wiper arm adapted to engage the contacts 2, 3, 4 and 5. The contacts 2, 3, 4 and 5 are coupled respectively to the conductors 53, 51, 49 and 47.

SS1 is stepped in response to the actuation of the magnet coil 55 which is in series with B+, the resistor 57 and the tube 31. SS1 will step four times for each one step of SS2. SS1 is stepped each time a pulse is communicated to the tube 31 through the conductors 41 and 27. Each time a pulse is communicated to the tube 31 causing this tube to conduct, the output of the tube is used not only to step SS1 through its magnet coil 55 but also is used to actuate the scaling circuit 95 and step SS2 once for every four steps of SS1. Each time the tube 31 conducts, a pulse is received by the scaling circuit 95 over the conductor 97. The scaling circuit 95 is set so as to allow current to pass through the magnet coil 101 once for every fourth pulse received by the tube grid 29. This pulse is of sufficient duration to step SS2 to its next contact. It is to be noted that the switches SS1, SS2 and SS3 step only at the break of the pulse and not at the moment of application of the pulse. Scaling circuits 95 and 96 are shown in block form as they are well known in the art and a showing of their circuitry is not necessary for an understanding of the invention. For the understanding of the operation of a scaling circuit, reference may be made to "Electronic and Radio Engineering," by Frederick E. Terman, fourth edition (1955), pages 660 and 661.

The "and" gate 59 has two inputs: the conductor 61 from the contact 15 of the WPG and the conductor 63 from the inverter 89. The "and" gate 65 also has two inputs: the conductor 87 from the wiper arm of SS1 and the conductor 67 from contact 15 of the WPG. The inverter 89 is also coupled to the wiper arm of SS1. The output of the "and" gate 59 connects to the grid 69 of the dual triode 71 and the output of the "and" gate 65 connects to the grid 73 of this same tube 71. In circuit with the right-hand side of the tube 71 is the complement writing head 83 and in circuit with the left-hand side of the tube 71 is the data writing head 81. The function of the "and" gate 65 is to pass a pulse and to cause the left-hand side of the tube 71 to conduct when information is to be written on the information track of the record medium and not on the complement track and the function of the "and" gate 59 is to pass a pulse and cause conduction of the right hand side of the tube 71 when there is no information to be written on the information track of the record medium but on the complement track. Both sides of the tube 71 cannot conduct at the same time as an output is present either at the output of the "and" gates 59 or 65 and never both at the same time.

*Description of Operation*

A write operation is the action of converting the amount stored in the decimal switches box 43 into a modified binary coded decimal representation and then encoding and storing this converted data magnetically on a magnetic tape or on the magnetic portion of a record medium.

To maintain the desired coding sequence, the highest order digit and highest order bit, or twelfth digit position, the seven bit, is written first and so on progressively to a lower order so that the last bit to be written is the units position digit, the one bit.

For the purposes of this explanation, we will assume that 48 bits are to be written on the complement and the data or information tracks but it is understood that the system can be expanded to write or encode any number of bits. Where, for example, there is no information data, such as the "one," "two" and "seven" bits for a digit "four," these three bits will be magnetically encoded on the complement track. The "four" or data bit will be magnetically encoded on the information track. Similarly, if a six is to be written on the magnetic portion of the record medium, the "two" and the "four" bits will be written in the data or information track and the "one" and the "seven" bits will be written by the complement head on the complement track.

In the case of writing, referring more particularly to FIG. 1, the data head 81 and the complement head 83 are shown as connected to individual plates of a dual triode write tube 71, which in the illustrated embodiment is shown to be a type 5687. The triode which is connected to the data or information head 81 is termed the information or data write tube and the triode which is connected to the complement head 83 is termed the complement write tube. The complement and data write circuits are shown schematically in the aforementioned figure.

When the write tube 71 is not conducting, the current flow through both magnetic heads will be from 250 volts through the plate resistor and through the magnetic head to 150 volts. The magnetic tracks will thus be polarized in what is designated as a negative or "zero" direction and any information on the track will be effectively erased. The magnetic polarity of any discrete areas will now be representative of a "zero." When the tube is conducting, the current flow through the head will be in the opposite direction. The circuit is from 150 volts through the magnetic head and through the tube 71 to ground. The magnetic track on the record medium will then be polarized in what is designated as a positive direction or representative of a "one" and the selected information or data will be recorded on the tracks. It follows from the foregoing that new information can be written magnetically on the magnetizable portion of the record medium through the expedient of controlling the conduction of the data and complement write tubes.

As previously explained, if a "one" is to be encoded on the data track, the "one" is encoded on this track and an erase is continued on the complement track. Conversely, when a "one" is to be encoded on the complement track, the data track continues to be erased. In order to simplify the circuitry, both magnetic heads are continuously erasing (or encoding "zeros") on their respective tracks and conduction of the proper side of the tube 71 will encode a "one" on the desired track by changing the direction of the current flow through the magnetic head.

As the record medium (not shown) is moved under the heads by a record moving means (not shown), the entire portion of the track on the record medium which is scanned by the magnetic heads will either be erased or have areas representative of "ones," because there is always a current flowing through the heads, in either the erase or write one direction.

The amount to be encoded on the magnetic track is set up and stored in the decimal switches box 43 and these switches may comprise a series of movable operating contacts having ten fixed contacts per switch, which are well-known in the art. The operating contacts for each digit are tied together. The ten fixed contacts of each digit are tied to a common line which represents a nine, an eight, a seven, and so on down to a one line. Only one operating contact for each order will be closed and this will represent the digit stored.

The nine individual lines representing the numbers 9 to 1 are electrically connected to the diode matrix 45 where the decimal information in the switches is converted into the modified binary coded decimal information. The output of the diode matrix 45 is as earlier mentioned, connected to SS1 and consists of four electrical lines each representing a "bit." There is illustrated herein a seven bit line, a four bit line, a two bit line and a one bit line. The decimal lines entering the diode matrix 45 from the decimal switches 43 are electrically interconnected so as to form a combination of the "bits."

The nine line has two diodes connecting it to the seven bit and two bit lines, the eight line has two diodes connecting it to the seven bit and the one bit lines, the seven bit has a single diode connecting it to the seven bit line, and so on down to the one line which is connected through a single diode to the one bit line. Diodes are used in the diode matrix 45 so that any decimal line having a voltage on it or which is electrically "hot" cannot make another decimal line "hot" inasmuch as the back resistance of the diodes makes all decimal lines into the bit positions unidirectional as far as current flow is concerned.

The input to the decimal switches 43 and the output of the diode matrix 45 are scanned by the wiper arms of their respective switches being actuated by the passage of current through their respective magnet coils 55 and 101. As pointed out previously, SS2 steps once for each four steps of SS1. SS2 is used for digit scanning while SS1 is used for selection of the correct "bit." As in reading then, SS1 will step once for each possible "bit" of information or in the example earlier set forth herein, 48 times. SS2 will take one step for each digit position or step 12 times. On every write pulse, SS1 will be conditioned to step on the break of the pulse, and on the break of every fourth pulse both SS1 and SS2 will be conditioned to step. This enables SS1 to selectively scan all four "bit" positions of a particular digit before SS2 selects the next successive digit position.

SS3 and its magnet coil 39 which cooperate as a conditional pulse transfer means, are utilized in the write operation as a first full pulse discriminator and also as a gate. This compound function is employed because of the speed of the operation of the step switches. A time of 10 milliseconds must be provided from the leading edge of one pulse to the leading edge of the next pulse. If this time were reduced, an error might occur. The magnet coil (not shown) which controls the make or break of the contacts 10, 18 and 14 of WPG (write pulse gate) is not synchronized with the action of the pulse generator 21; therefore, it is possible that the contact points of WPG could make at a time which allows a fraction of a write pulse to be transmitted to SS3, the relay coil 39, the write tube and the scanning circuit. This pulse may not have a sufficient time duration to step SS3 but would be recorded on a magnetizable track of the record medium and would cause an erroneous number of pulses or digit to be recorded on the record medium. If the correct number of pulses were encoded upon the record medium because the first pulse was long enough to operate SS3, the leading edge of the first pulse received from the continuously operating pulse generator 21 would be less than 10 milliseconds from the next by that fraction of the first pulse that was lost. It is necessary, therefore, that the first pulse to be recorded be a complete 3 millisecond pulse.

As before-mentioned, the construction and operation of SS3 is described and claimed in detail in the co-pending application of Deighton, Serial No. 492,247, now Patent 2,906,838. Briefly, the step switch in the co-pending application comprises a rocker arm which is energized by the step switch coil 39. The energization of the coil 39 pulls a clapper into engagement with the rocker arm which locks the rotary contacts of the step switch so that the step switch does not move from its initial position but will remain on the same contact. When the pulse is extinguished or breaks, the step switch coil through the clapper and rocker arm allows the step switch to advance one step. The step switch is so constructed that a partial pulse, that is, a pulse of less than a predetermined length, is not sufficient to move the rocker arm and clapper and cannot, therefore, cause stepping of the switch upon the break of the pulse. A partial pulse or a segment of a pulse which passes through the contacts 10 and 11 of WPG, to the B contact of SS3-tier 2 and thence through the magnet coil 39 to ground, would not be of sufficient duration to step SS3 so the pulse passes on to ground and would not enter the write circuitry.

Therefore, it can be seen that the step switch performs the function of a first full pulse discriminator in that it is pulse length responsive, rejecting all partial first pulses and stepping only when a full pulse is passed through the magnet coil 39. Herein, the term "complete pulse" indicates a pulse having the same length as that normally produced by the pulse generator. The term "full pulse" means a pulse of at least that predetermined length, i.e., time duration, which will activate the discriminator.

This same step switch is used as a gate by virtue of the utilization of an inhibit voltage to cause the switch to step from an active contact to a contact preventing pulses from entering the writing circuits. In the example set forth herein, the circuit is conditioned to write only 48 complete pulses at which time the scaling circuit 96, after receiving the 48 complete pulses from the conductor 41, presents an inhibit voltage at the terminal 85 and steps the step switch SS3 to prevent further pulses from entering the write circuit. The 48 pulses are counted by the scaling circuit 96 which, as noted, is designed to emit a pulse for each group of 48 pulses which it receives.

Thus, the stepping switch SS3 and its associated magnet coil 39 have cooperated as a conditional pulse transfer means and acted as a first full pulse discriminator and as a gate circuit.

The first 115 volt pulse from the pulse generator 21 generated by the engagement of contact 2, with contact 1 by means of the cam 23, will go through the WPG 18 and 19 (assuming the relay coil of WPG, not shown, has already been energized but not the relay coil of RES, not shown) and be applied to the rotary contact of SS3-tier 1. Since the wiper arm is on the number 2 contact, this pulse finds an open circuit. This emitter pulse also goes through WPG 10 and 11 and is applied to SS3-tier 2 through the rotary contact or wiper arm, to the B contact and thence through the magnet coil 39 of SS3, causing that relay coil 39 to be energized. As aforementioned, if this pulse is adequate to actuate the armature of SS3, i.e., a full pulse, SS3 will step its rotary contacts from 2, B and 2 of the tiers 1, 2 and 3, respectively, to contacts 3, C and 3 on the break of the pulse. If the pulse is inadequate in time duration to actuate the armature and thus not step SS3, the next full pulse will be applied across SS3 magnet coil 39, through the same circuit, causing the step switch rotary contacts to step on the break of that pulse. The rotary contact of step switch 3-tier 2 will step from B, to an open point, or contact C, thus breaking the circuit to the magnet coil 39. The rotary contact of SS3-tier 1 will step to contact 3 which will allow the succeeding pulses to scan the decimal switches box 43 through the conductor 41 and SS2 for magnetically encoding the numbers contained in the decimal switches box 43. Since the step switch requires approximately four milliseconds to step its contact from the break of one pulse to the make of the next pulse, and the time between pulses is seven milliseconds, the first pulse available to the write circuits through the step switch contact located at SS3-tier 1, contact 3, will always be a complete 3 millisecond pulse. The succeeding pulses emanating from the pulse generator 21 and traveling through SS3-tier 1, will be seen by the write circuits and the scanning circuits. The pulses cannot pass to contact 3 of SS3–T3 because the magnet coil of RES has not been activated as yet.

The succeeding pulse from the pulse generator 21 or the first pulse to be recorded, will travel through the contacts 18 and 19 of WPG, through the rotary or wiper arm of SS3-tier 1, to contact 3 and will go to an input on the "and" gate 65 and the input on the "and" gate 59 through the contacts 14 and 15 of WPG. The "and"

gate 65 is also known as an information coincidence detector and the "and" gate 59 is known as the complement coincidence detector. The pulse sent to these gates is also sent to the wiper arm of SS2, to the scaling circuit 96 and to the grid 29 of the tube 31. The rotary contact of SS2 is stationary at its initial position on the number 2 contact. For the purposes of this explanation it is assumed that the number 038000017459 is to be written in a modified binary code upon the magnetic tracks of the record medium. This means that the decimal switch associated with contact 2 of SS2, is at 0, the switch associated with contact 3 is at 3, the switch associated with contact 4 is at 8, etc.

As each digit of a group of digits is represented by the polarity of four discrete areas on each of the magnetic tracks, a zero (038000017459 is written from left to right) is represented in our modified binary code by a zero in area one of the data track, and a "one" in area one of the complement track; a zero in area two of the data track and a one in area two of the complement track; a zero in area three of the data track and a one in area three of the complement track; and a zero in area four of the data track and a one in area four of the complement track. Similarly, a 3 (3=2+1) is represented on the magnetic tracks as a zero in area one of the data track and a one in area one of the complement track; a zero in area two of the data track and a one in area two of the complement track; a one in area three of the data track and a zero in area three of the complement track; and a one in area four of the data track and a zero in area four of the complement track. Thus it is seen that area one refers to the area where a representative seven is written; area two to where a representative four is written; area three to where a two is written; and area four where a one is written. As explained previously, current is normally flowing through the heads in the zero direction. Conduction of one side of the tube 71 or the other, will reverse the current flow in that head and write a one. Thus, zeros are always written unless conduction of the tube occurs at which time a one is to be written.

The first complete pulse which now appears on the rotor of SS2 is applied to contact 2 of SS2 and since no contact of the decimal switch associated with the contact 2 of SS2 has been actuated as a zero (the left hand digit of 038000017459) is to be written, no output is produced on any of the lines 1–9 of the diode matrix 45. As noted, the tube 31 received the pulse over the conductors 41 and 27 from the number 3 contact of SS3–T1 and this tube now conducts by virtue of the grid 29 being raised to conducting potential. The coil 55 is thus energized but will not step SS1 from the 2 contact to the 3 contact until the break of the pulse. Before the break of the pulse, no voltage is present on the conductor 53 and thus no voltage is present on the conductor 87 to "and" gate 65 and the inverter 89.

The inverter 89 is a device that will present a high potential on the conductor 63 when no potential is applied to the conductor 87 and vice versa, i.e., no potential will be placed upon the conductor 63 when a high potential is on the conductor 87. Inverters of this type are well-known in the art and the circuitry of the inverter is not believed necessary for an understanding of the invention.

Continuing with the process to write a "one" on the magnetic complement track of the record medium, an input potential is now present at the conductor 61 and the conductor 63 to the "and" gate 59. The input is present at the conductor 63 due to the inverting action of the inverter 89 as just described. An input potential is also present at the conductor 61 due to the fact that SS3-tier 1 is presently resting on the number 3 contact and this input has passed through the contacts 14 and 15 of WPG since this relay is now closed. An output potential is produced on the conductor 91 from the "and" gate 59 to the grid 69 of the tube 71. The tube 71 is caused to conduct on its right side only thereby reversing the current through the complement head 83 and magnetically encoding a "one" in area one upon the complement track of the record medium. A zero was written in area one of the data track as that is constantly being energized so as to erase the data track. At the break of the first pulse to enter the circuitry, SS1 now steps to the number 3 contact.

The next pulse from the pulse generator 21 will not cause stepping of SS3 as there is no electrical path to the magnet coil 39 but will cause conduction of the tube 31 and the subsequent stepping of SS1 from the number 3 contact to the 4 contact at the break of the pulse. Before SS1 steps, however, no voltage is present at the 3 contact of SS1 and a similar operation ensues and a second pulse is emitted from the output conductor 91 of the "and" gate 59 causing conduction of the right hand side of the tube 71 only. Thus a magnetic one has been placed in the area two of the complement magnetic track of the record medium. A zero or erase was written in area two on the data track. The succeeding pulse from the pulse generator 21 causes SS1 to step resulting in conduction of the right hand side of the tube 71 and subsequent magnetic encoding upon the complement track of the record medium.

At the end of the fourth written pulse, SS1 is now back on its number 2 contact and SS2 has stepped to its number 3 contact by virtue of the scaling circuit 95 having received four pulses and having passed a pulse through the magnet coil 101 to step SS2 one step.

As stated previously, the number stored in the decimal switches box 43 which was proposed to be written on the information and complement tracks of the record medium is 038000017459 and the first digit or the zero has already been written. The next digit to be written in the 3 and a representation of a 3 has been stored in the decimal switch associated with the number 3 contact of SS2.

The sixth pulse from the pulse generator 21 (the fifth pulse to pass from SS3–T1 contact 3, assuming that the first pulse was a full pulse) will find a path over the conductor 25 through the contacts 18 and 19 of WPG, through SS3-tier 1 contact number 3 and through the contacts 14 and 15 of the WPG to the conductor 67. A path for the pulse is also available, from the number 3 contact of SS3-tier 1 over the conductor 41 to the wiper arm of SS2, the wiper arm now resting on the number 3 contact, to the grid 29 of the tube 31 and, of course, to the scaling circuit 96. The number to be written, as noted previously, is a 3 and in our binary code referring to the diode matrix 45, the 3 comprises a 1 and a 2. Therefore the fifth pulse which has entered the decimal switches box 43, will cause a voltage to be present on the 1 and 2 channels, conductors 47 and 49, and no voltage will appear on the 4 and 7 channels, conductors 51 and 53. As the conductor 53, which communicates with the number 2 contact of SS1, is not electrically "hot," a pulse will be emitted from the "and" gate 59 over the conductor 91 to the grid 69 of the right hand side of the tube 71, as previously explained, to reverse the current flow through the complement head 83 and write a one on the complement track of the record medium.

On the next pulse, SS1 will have been advanced to the number 3 contact and since no voltage is available at this contact the complement "and" gate 59 will produce an output and a magnetic mark will thus be written on the complement track of the record medium.

On the next pulse, SS1 will have been advanced to its number 4 contact. A voltage is encountered since the 3 which is to be written is a combination of a 1 and 2 in the diode matrix 45. At this time, a voltage appears, as stated, on the number 4 contact of SS1 and consequently on the conductor 87 to the inverter 89 and the "and" gate 65. Concurrently, the inverter 89 presents no output over the conductor 63 to the "and" gate 59 but same as that of FIGURE 1 in that the first pulse from the "and" gate 75 will be applied to the wiper arm of SS2, to the "and" gates 59 and 65, and to the tube 31 over the conductors 27 and 41 to step SS1 by its magnet coil 55 to read the values stored in the decimal switches box 43.

The first pulse through the "and" gate 75 must always be a complete pulse since the flip-flop 79 can only change state during the off time of the cam contact 23 of the pulse generator 21 because of the timing involved. During the writing operation, a relay coil, not shown, will open the contacts 8 and 9 of WPGD so that the flip-flop 79 cannot be turned on immediately after the insertion of the inhibit voltage to stop the writing on the record medium at the conclusion of the desired number of pulses. The circuitry has thus acted as a gate by resetting the flip-flop 79 at the conclusion of the desired number of pulses. The resetting of the flip-flop 79 conditions the "and" gate 75 off so that only the desired number of complete pulses are written.

The writing operation is concluded with the encoding of 12 digits in a modified binary coded form on the magnetic strips or tracks of the record medium. The circuitry has acted as a first full pulse discriminator by rejecting the initial pulses if they are not of sufficient time duration and as a gate by the application of an inhibit voltage to prevent the pulses from entering the write circuitry at a specified time.

I claim:

1. In a system utilizing complete pulses in dual outputs and receiving pulses through an asynchronous switch, a device for rejecting initial pulses of less than a predetermined length and for gating a preselected number of complete pulses to said outputs comprising a first "and" gate, a direct connection between said asynchronous switch and one input of said first "and" gate, pulse length responsive means coupled between said switch and another input of said first "and" gate, having actuating means made operative only by the receipt thereto of a predetermined length of pulse and actuated no later than the cessation of the first pulse of at least that predetermined length from said asynchronous switch, second and third "and" gates, the output of said first "and" gate being coupled to one input of each of said second and third "and" gates, switching means coupled between another input of said second "and" gate and the output of said first "and" gate, electrical inverting means coupled between said other input to said second "and" gate and another input to said third "and" gate, and means coupled to said first "and" gate and to said pulse length responsive means to inhibit passage of pulses through said first "and" gate after the passage of a preselected number of pulses therethrough.

2. The combination as defined in claim 1 wherein said pulse length responsive means comprises a flip-flop triggered by a univibrator.

References Cited in the file of this patent

UNITED STATES PATENTS

| | | |
|---|---|---|
| 2,403,873 | Mumma | July 9, 1946 |
| 2,545,464 | Hoeppner et al. | Mar. 20, 1951 |
| 2,696,599 | Holbrook et al. | Dec. 7, 1954 |
| 2,810,122 | Lanning | Oct. 15, 1957 |
| 2,812,509 | Phelps | Nov. 5, 1957 |
| 2,912,672 | Loper | Nov. 10, 1959 |

FOREIGN PATENTS

| | | |
|---|---|---|
| 770,034 | Great Britain | Mar. 13, 1957 |

OTHER REFERENCES

"Arithmetic Operations in Digital Computers," by R. K. Richards, pp. 78, 79, and 126, Van Nostrand Co., 1955.

allows the voltage to remain on the conductor 87 which communicates with the "and" gate 65. At this point, both inputs to the "and" gate 65 have a potential on them and consequently an output is obtained over the conductor 93 which communicates with the grid 73 of the tube 71. Conduction of the left hand side of the tube 71 ensues and a magnetic polarization representative of a one is made upon the information or data track of the record medium.

Similarly, the next pulse will find SS1 on its number 5 contact and as explained previously, this line is electrically "hot" and the subsequent conduction of the "and" gate 65 causes a magnetic polarization representative of a one to be placed upon the information track of the record medium.

This process continues until the whole number 038000017459 has been written on the information and the complement tracks of the record medium.

At the conclusion of the 49th pulse, the first full pulse being used to step SS3 and the next 48 complete pulses being encoded, an inhibit voltage is applied to the terminal 85. The scaling circuit 96 has connected the emitter pulse to terminal 85 as this device emits a pulse for every 48 pulses received. The pulse emitted is sufficient to step SS3 through the action of the energization of the magnet coil 39 associated with that stepping switch. Stepping SS3–T1 rotor from contact 3 to 4 will open the circuit to the emitter 21 thus preventing any further pulses from reaching the write circuits.

A relay coil associated with the contacts 16 and 17 of RES (the relay coil is not shown) will close the contacts 16 and 17 of RES upon energization and pulses will be applied from the pulse generator 21 through SS3-tier 3 until the rotor of tier 3 steps off the number 5 contact thus placing SS3 in its home position.

The cycle is ready to be repeated as soon as a new amount is placed in the decimal switches box 43.

Thus, 48 complete pulses have been written on the record medium which is representative of the decimal number 038000017459. The SS3 and its associated relay coil 39 has functioned as a first full pulse discriminator in that it has rejected all initial pulses of insufficient time length to step SS3. It has acted as a gate in that the SS3 has stepped off its active contacts upon the application of an inhibit voltage and thus precluded a voltage from appearing at either of the "and" gates 59 or 65.

Figure 2:
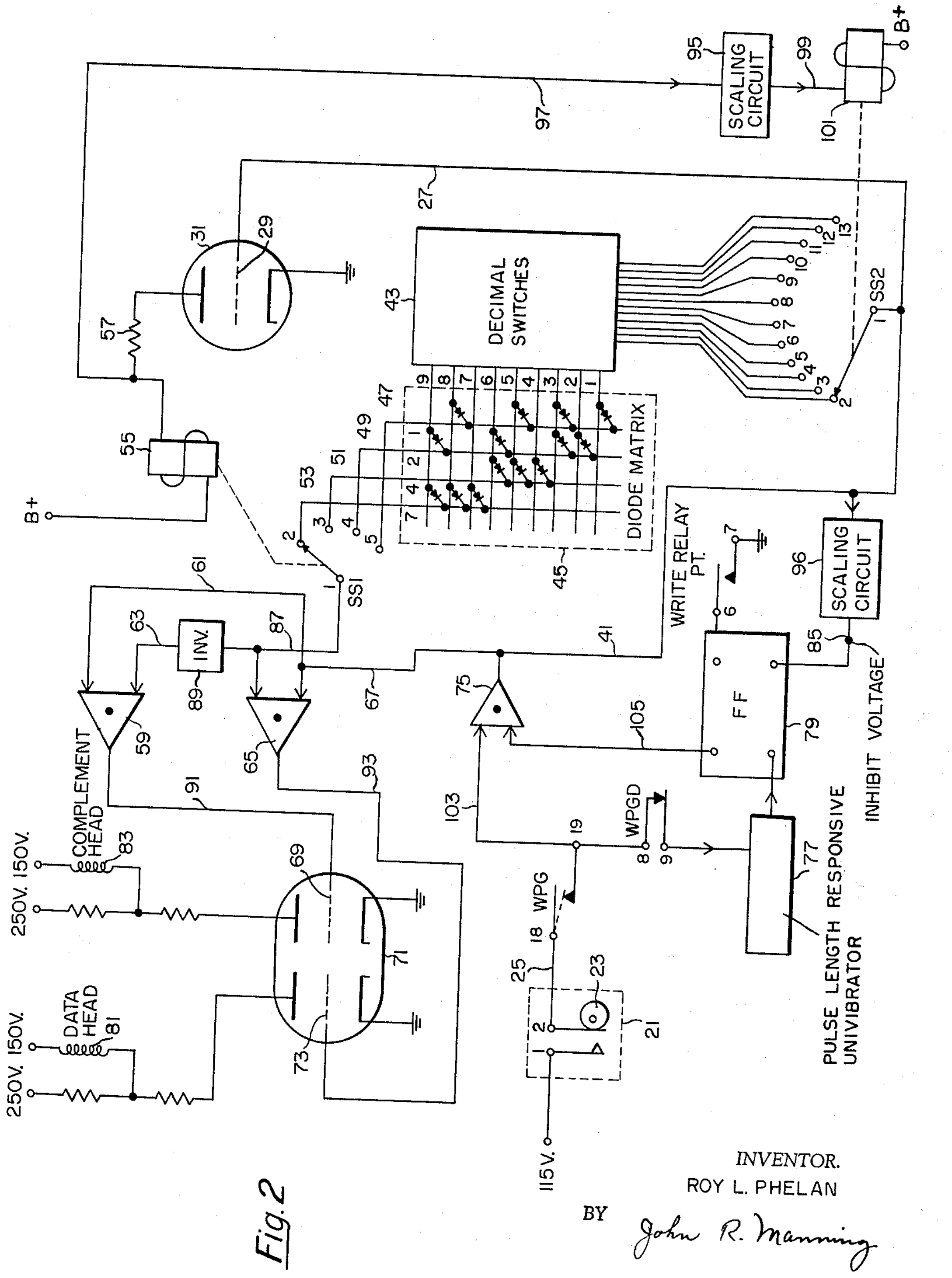
FIG. 2 is a circuit diagram showing another mode of accomplishing the invention but capable of much higher speeds than the magnetic writing circuit of FIGURE 1.

The speed of operation of the device of FIGURE 1 can be measurably increased by means of the circuit of FIGURE 2 which is similar to FIGURE 1 except that SS3 and its associated relay coil 39 have been deleted and an electronic circuit comprising an "and" gate, a univibrator, a flip-flop and lesser circuitry has been substituted therefor and comprises conditional pulse transfer means.

Referring now more particularly to FIGURE 2, there has been substituted for contacts 10 and 11 of WPG, contacts 16 and 17 of RES, contacts 14 and 15 of WPG and SS3 with its magnet coil 39, the electronic circuit comprising the "and" gate 75, the contacts 8 and 9 of WPGD (write pulse gate delay), the univibrator 77 and the flip-flop 79 and the write relay point contacts 6 and 7. The remainder of the circuits of FIGURES 1 and 2 are substantially identical and will therefore, not be described again in detail.

The "and" gate 75 has two inputs: one from the contact 19 of WPG and the other from the output of the flip-flop 79. The univibrator 77 has an input from the contact 9 of WPGD and an output to the flip-flop 79. The flip-flop 79 has connected thereto a lead from a source of inhibit voltage which will place the flip-flop 79 in its "off" condition. Also leading from the flip-flop is the contact 6 of the write relay point. The contact 6 is adapted to engage the contact 7 of this relay when writing begins to set the flip-flop in its "off" position. If the flip-flop 79 is already in the "off" position when this contact makes, no change of state will occur. The univibrator 77 and the first flip-flop 79 act as pulse length responsive actuating means to control gate 75.

The output of the "and" gate 75 communicates with the stepper arm of SS2, the grid of tube 31, "and" gate 65, the "and" gate 59, and the scaling circuit 96.

In FIGURE 2 of the electronic circuit, which has been substituted for SS3 and its associated relay coil 39, is used to write the same number, i.e., 038000017459, as before upon the complement and data tracks of the record medium. The flip-flop 79 is a conventional one having two stable states, i.e., a state where it is off and a state where a high output is applied to the "and" gate 75 over the conductor 105. The univibrator 77 can be a 2–3 millisecond pulse duration responsive device capable of triggering the flip-flop.

When the information is to be written after the decimal switches box 43 have been set, a relay coil, not shown, will be actuated and close the contacts 18 and 19 of WPG as shown in dotted outline in FIGURE 2. This will allow the pulses from the pulse generator 21 to enter the circuit. The first full pulse from the pulse generator 21 will not be written on the record medium but is used to condition the circuitry for writing. The first full pulse will be applied to the "and" gate 75 over the conductor 103 and also to the univibrator 77 through the normally closed contacts 8 and 9 of WPGD (write pulse gate delay). The first full pulse is delayed in its path through the univibrator 77 and the flip-flop 79 long enough so that no coincidence of inputs appears at the input points or conductors 103 and 105 of the "and" gate 75. Therefore, no output is derived from the "and" gate 75 during the application of the first full pulse to the conductor 103 and the univibrator 77.

The delay through the univibrator 77 and the flip-flop 79 is caused by the triggering of the flip-flop 79 from the trailing edge of the pulse output from the univibrator 77. The univibrator 77 supplies a pulse having an operating time length measured between the leading and trailing edge thereof that is at least equal to the pulse duration time of the individual pulses of the pulse generating means 21 but less than the off time of the pulse generator 21.

If the first pulse is a full pulse, the univibrator is triggered into conduction, and the trailing edge of the output pulse from the univibrator is utilized to cause the flip-flop 79 to change state. This causes the output of the flip-flop 79 over conductor 105 to the "and" gate 75 to open the "and" gate for the next pulse after the first full pulse, since the first full pulse has already terminated during the duration of the univibrator pulse.

If the first pulse is not a full pulse, i.e., not of sufficient time duration to trigger the univibrator 77, the univibrator 77 remains non-conducting and the circuit awaits the arrival of the first full pulse. It is thus clearly evident from the foregoing that the circuit has acted as a first full pulse discriminator in that it is capable of rejecting a pulse which is not of sufficient time duration to trigger the univibrator 77 and accurately place a magnetic mark upon the record medium.

Assuming the first pulse was not of sufficient time duration to trigger the univibrator 77 and produce an output to the flip-flop 79, the second pulse, if full, will trigger the univibrator 77 and the trailing edge of the pulse from the univibrator will cause the flip-flop 79 to change state, and condition the output of the flip-flop 79 over the conductor 105 at some potential dependent upon the circuit parameters of the flip-flop 79.

With a voltage now appearing on the conductor 105, subsequent pulses applied to the univibrator 77 and to the "and" gate 75, will not affect the flip-flop 79 but will cause the "and" gate 75 to emit an output pulse for each pulse from the pulse generator 21.

The circuit of FIGURE 2 now behaves substantially the